(12) United States Patent
Lee et al.

(10) Patent No.: US 7,548,324 B2
(45) Date of Patent: Jun. 16, 2009

(54) THREE-DIMENSIONAL SHAPE MEASUREMENT APPARATUS AND METHOD FOR ELIMINATING 2π AMBIGUITY OF MOIRE PRINCIPLE AND OMITTING PHASE SHIFTING MEANS

(75) Inventors: Hyun Ki Lee, Daejeon (KR); Hyung Suck Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 264 days.

(21) Appl. No.: 11/716,059

(22) Filed: Mar. 1, 2007

(65) Prior Publication Data

US 2007/0211258 A1   Sep. 13, 2007

(30) Foreign Application Priority Data

Mar. 7, 2006   (KR) ...................... 10-2006-0021319

(51) Int. Cl.
*G01B 11/30* (2006.01)
(52) U.S. Cl. ....................................... 356/605
(58) Field of Classification Search .......... 356/601–613
See application file for complete search history.

(56) References Cited

U.S. PATENT DOCUMENTS

| 4,525,858 A | * | 6/1985 | Cline et al. | 382/154 |
| 5,175,601 A | * | 12/1992 | Fitts | 356/604 |
| 5,852,672 A | * | 12/1998 | Lu | 382/154 |

FOREIGN PATENT DOCUMENTS

KR    2005-31328    4/2005

\* cited by examiner

*Primary Examiner*—Tarifur R. Chowdhury
*Assistant Examiner*—Isiaka O Akanbi
(74) *Attorney, Agent, or Firm*—Graybeal Jackson LLP

(57) ABSTRACT

A three-dimensional (3-D) shape measurement method using a Moire measurement principle and a Stereo vision measurement principle is provided. The method comprises; a first step to detect candidate points and 3D positions of the candidate points in world coordinates which are identical results from typical Moiré technique by using a pattern projector, which adjusts a pitch of a fringe pattern and projects the fringe pattern to a measurement object, and a first camera, which detects a modulated fringe pattern caused by shape of the object, by means of obtaining candidate points by comparing a reference fringe pattern to the modulated fringe pattern and calculating 3D positions at an arbitrary point on an image captured from the first camera; a second step to determine a final matching point among the candidate points detected from the first step by using the Stereo vision technique with the first and the second cameras, by means of projecting the 3D positions of the candidate points to an image plane of the second camera based on a camera matrix of the second camera, comparing intensity value of a projected point in the image plane of the second camera to intensity value of given point in the image plane of the first camera, and judging whether the candidate point is matched with an arbitrary point by using the stereo vision criteria; and a third step to measure the depth value of the arbitrary point by using the resultant value of the final matching point, which was determined at the second step. Therefore, the error of 2π ambiguity of the typical Moire principle is eliminated, and thus 3-D shape information can be more rapidly and accurately measured.

6 Claims, 6 Drawing Sheets

PATTERN IMAGE(L)   PATTERN IMAGE(R)

THREE-DIMENSIONAL SHAPE MEASUREMENT APPARATUS AND METHOD FOR ELIMINATING 2π AMBIGUITY OF MOIRE PRINCIPLE AND OMITTING PHASE SHIFTING MEANS

BACKGROUND OF THE INVENTION

1. Field of the Invention

The present invention relates, in general, to a three-dimensional shape measurement apparatus and method using the Moire principle and Stereo vision principle, and more particular, to a three-dimensional shape measurement apparatus and method, which is implemented in order to prevent the error of 2π ambiguity from occurring in a measurement method using the Moire principle, thus more precisely measurement of the shape of a measurement target.

2. Description of the Related Art

Several techniques including an optical triangulation method using a laser structured light, a stereo vision method using two intensity images, the Moire technique, etc. have been developed to measure the three-dimensional (3-D) shapes of objects. Among these methods, the Moire measurement method has widely been used because it offers excellent precision and short time for measuring timely measurement of 3D shape. However, it has an inherent limitation: 2π ambiguity, which occurs when target objects have a depth greater than the pitch of a projected fringe pattern. Therefore, in the prior art, when the phase difference between a location to be measured and a nearby reference location is more than 2π, the problem of the 2π ambiguity is solved by correcting the height value by adding ±2Nπ, where N is an arbitrary natural number. However, the conventional 3-D shape measurement method using the Moire principle still has a problem in that, if two measurement objects are spaced apart from each other by a distance of 2π or more, it is difficult to determine whether the resultant value of measurement is caused by the 2π ambiguity or that it indicates a measurement object having a depth of more than 2π. Consequently, incorrect measurement results may occur. Therefore, in the prior art, much effort was devoted to solving 2π ambiguity using other methods.

Technology disclosed in Korean Patent Laid-Open Publication No. 10-2005-0031328 and entitled "3-D inspection method and apparatus using stereo vision and Moire" involves a scheme in which a light projection unit projects a certain pattern several times, and a target object is measured using two cameras respectively while shifting the phase of the fringe pattern using a actuator. Such technology based on the above scheme can accumulate 3-D shape information every time while shifting the phase of the fringe pattern. The plurality of pieces of 3-D shape information measured in this way can then be compared with each other, and finally the 3-D shape information about the measurement object is obtained. However, this technology is problematic in that, even if the 3-D shape information about the object can be relatively precisely measured while eliminating 2π ambiguity, hardware, such as an actuator for shifting the phase of the fringe pattern, must be provided. In addition, considerable time is required to measure the 3D shape of the object.

SUMMARY OF THE INVENTION

Accordingly, the present invention has been made under consideration of the above problems in the prior art. The first objective of the present invention is to provide a 3-D shape measurement apparatus and method that can more precisely measure a 3-D shape, eliminating 2π ambiguity while adopting the typical Moire principle. The second objective of the present invention is to provide a 3-D shape measurement apparatus and method that can detect the depth value of an object by using only one stereo image without requiring a hardware means for shifting the phase of the projected fringe pattern, unlike the prior art.

In order to accomplish the aforementioned objectives, the present invention provides a three-dimensional (3-D) shape measurement method using a Moire measurement principle and a Stereo vision measurement principle, comprising: a first step to detect candidate points and 3D positions of the candidate points in world coordinates which are identical results from typical Moiré technique by using a pattern projector, which adjusts a pitch of a fringe pattern and projects the fringe pattern to a measurement object, and a first camera, which detects a modulated fringe pattern caused by shape of the object, by means of obtaining candidate points by comparing a reference fringe pattern to the modulated fringe pattern and calculating 3D positions at an arbitrary point on an image captured from the first camera; a second step to determine a final matching point among the candidate points detected from the first step by using the Stereo vision technique with the first and the second cameras, by means of projecting the 3D positions of the candidate points to an image plane of the second camera based on a camera matrix of the second camera, comparing intensity value of a projected point in the image plane of the second camera to intensity value of given point in the image plane of the first camera, and judging whether the candidate point is matched with an arbitrary point by using the stereo vision criteria; and a third step to measure the depth value of the arbitrary point by using the resultant value of the final matching point, which was determined at the second step.

Further, the present invention provides a three-dimensional (3-D) shape measurement apparatus to eliminate 2π ambiguity of a typical Moire principle and omit the phase shifting means from a 3-D shape measurement apparatus, comprising: a pattern projector for periodically scanning light; first and second cameras for detecting fringe patterns using the light of the pattern projector; and a control unit for controlling operation of the pattern projector and the first and second cameras, wherein the pattern projector comprises a light source installed therein for radiating light, a rotating polygonal mirror for rotating by itself to reflect light radiated by the light source, and a photodetector for detecting part of the light reflected from the rotating polygonal mirror, wherein the first camera detects a fringe pattern at an arbitrary position so as to detect candidate points having 2π ambiguity, wherein the second camera is placed to left of the first camera and is adapted to determine whether a corresponding point, having a fringe pattern identical to the fringe pattern detected by the first camera, exists among the candidate points having 2π ambiguity, and wherein the control unit controls a rotating speed of the rotating polygonal mirror and On/Off periods of the light source according to a program preset on the basis of feedback information of light measured by the photodetector.

BRIEF DESCRIPTION OF THE DRAWINGS

The above objectives, features, and other advantages of the present invention can be more clearly understood from the following detailed description made in conjunction with the accompanying drawings, where.

DESCRIPTION OF THE PREFERRED EMBODIMENTS

Hereinafter, a 3-D shape measurement apparatus and method using typical Moire principle according to embodiments of the present invention are described in detail with reference to the attached drawings.

Figure 1:
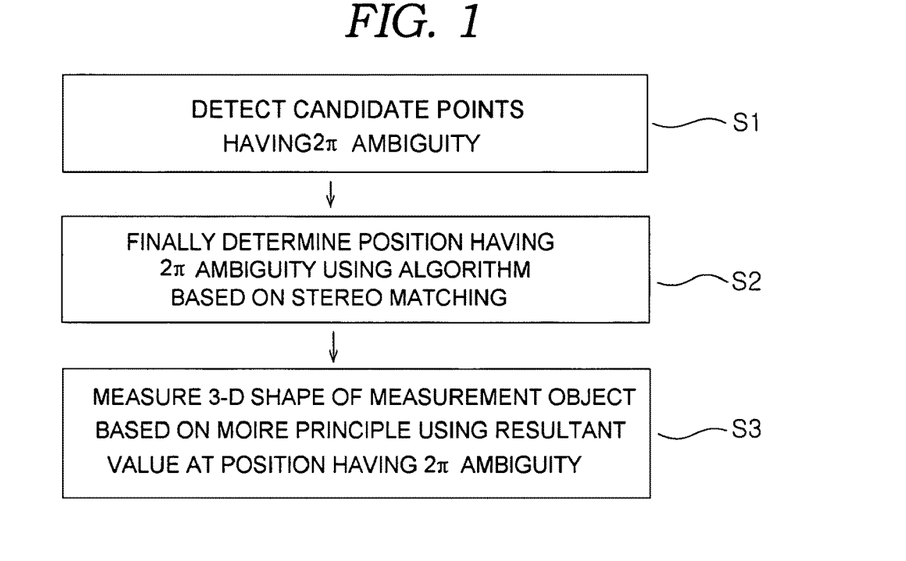
FIG. 1 is a flowchart of a 3-D shape measurement method to eliminate the 2π ambiguity of the typical Moire principle embodied in the present invention.

A 3-D shape measurement method to eliminate the $2\pi$ ambiguity of the typical Moire principle and omit phase shifting means is performed according to the steps shown in FIG. 1 while adopting the typical Moire principle. This is implemented using the apparatus of FIG. 2.

Figure 2:
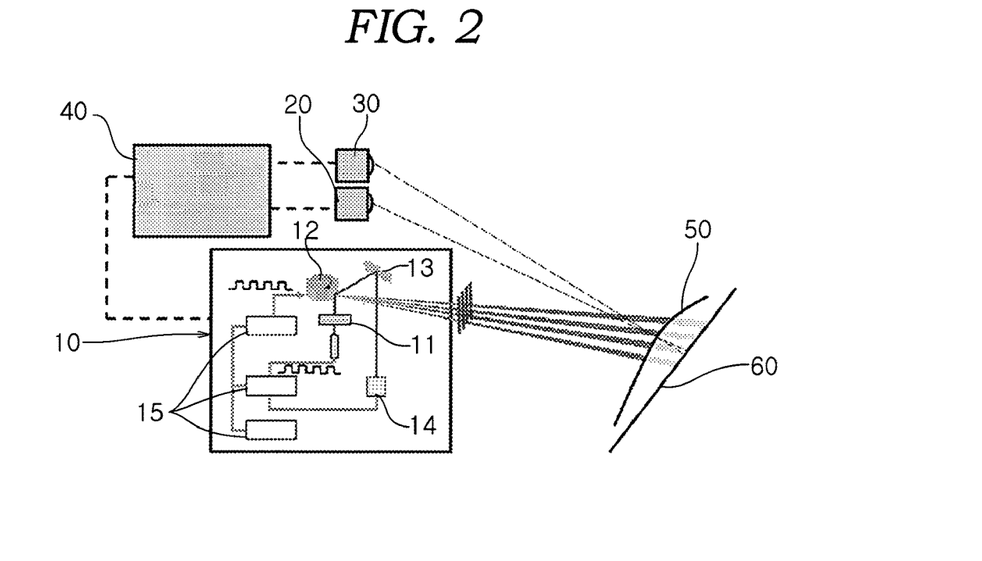
FIG. 2 is a schematic diagram of a 3-D shape measurement apparatus using a pattern projector and two cameras to implement the 3-D shape measurement method of FIG. 1.

The 3-D shape measurement apparatus used in the present invention includes a pattern projector 10 for flexibly adjusting the pitch of the fringe pattern and projecting the periodic fringe pattern across a measurement object 50, first and second cameras 20 and 30 which are calibrated, meaning that the internal and external parameters thereof have been verified, and a control unit 40 for comparing images measured by the first and second cameras 20 and 30 with each other and analyzing the compared images while controlling the operation of the pattern projector 10.

In particular, the pattern projector 10 of the present invention includes a light source 11 installed therein for radiating light (laser light), which is slit light, a rotating polygonal mirror 12 for reflecting the light radiated by the light source 11 in the direction of the measurement object 50, a reflective mirror 13 for reflecting part of the light, reflected from the rotating polygonal mirror 12, in another direction, and a photodetector 14 for measuring the intensity of light incident from the reflective mirror 13. Further, in the present invention, feedback information about light measured by the photodetector 14 of the pattern scanner 10 is transmitted to the control unit 40. Then, the pattern scanner 10 is operated to control the pattern period of the light scanned in the direction of the measurement object 50 while the rotating speed of the rotating polygonal mirror 12 and the On/Off periods of the light source 11 are controlled, depending on a program input to the control unit 40 on the basis of the feedback information. In this case, in the pattern scanner 10 of the present invention, timers 15 operating in cooperation with the rotating polygonal mirror 12 and the light source 11 are installed to control the rotating speed of the rotating polygonal mirror 12 and the On/Off periods of the light source 11.

The present invention measures the 3-D shape of a measurement object, using the above 3-D shape measurement apparatus having the above construction, as follows, in order to omit a phase shifting means and eliminate the $2\pi$ ambiguity of the typical Moire principle.

First, the present invention is based on a measurement method using the typical Moire principle among a plurality of 3-D shape measurement technologies. The measurement method using the Moire principle is described in brief. If a regularly striped grating is placed in front of the measurement object, and light is illuminated to the measurement object in a certain direction through a grating, the shadow of the grating is projected onto the surface of the measurement object. The regular fringe pattern that is caused by the shadow of the grating is modulated according to the shape of the object. The surface of the measurement object is then viewed in another direction using a camera through another grating that is located in front of the camera and has the same pitch with the grating located in front of the light source. A modulated fringe pattern on the surface of the object is shown as a Moire pattern, such as a wave-shaped contour line, due to overlapping of the grating shadows. At this time, by analyzing this Moire pattern, the 3-D shape of the measurement object having height information can be acquired. However, the 3-D shape measurement method using the typical Moire principle may yield errors when the measurement object has a height greater than the pitch of the projected fringe pattern, noted above as being the problem of the prior art. In addition, a typical pattern projector that consists of light, lens, and grating cannot generate a fringe pattern with flexible pitch.

Hence, in the present invention, to solve these problems we used a pattern projector, by which the pitch of the fringe pattern can be adjusted, and developed new measurement algorithm. The present invention more accurately measures 3-D shape information of objects by detecting candidate points having $2\pi$ ambiguity, which is estimated by the typical Moire principle and by determining the matching point among these candidate points by adopting the stereo vision principle, as described in the following process.

Figure 3:
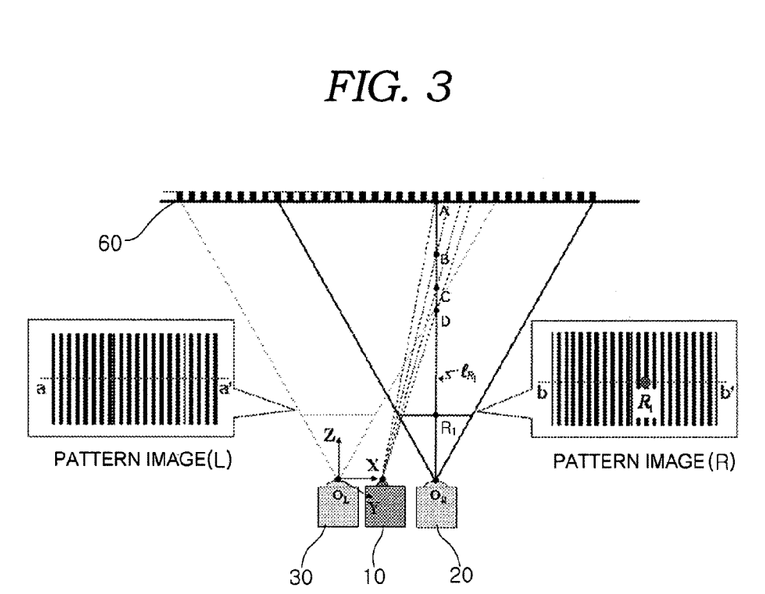
FIGS. 3 and 4 are schematic diagrams showing the states in which the first and second steps of the 3-D measurement method of FIG. 1 are performed using the 3-D shape measurement apparatus of FIG. 2.

In the first step S1 of the present invention, light formed by fine grating is projected across a reference surface 60 using the pattern projector 10, which freely controls the pitch of the fringe pattern. The positions are detected on the reference surface 60, and have the same intensity value of the fringe pattern at an arbitrary position $R_1$ on a single fringe image detected by the first camera 20. Thus, points having the detected positions in the reference plane fringe patterns are recognized as matching points having $2\pi$ ambiguity.

Referring to FIG. 3, the present invention sets a line $l_{R1}$ to connect a fringe edge point in the image plane, which is the arbitrary position $R_1$ on an arbitrary fringe image plane of the first camera 20, to the center point $O_R$ of the first camera 20. Such a line $l_{R1}$ is obtained using the following Equation [1].

$$Z = \frac{M_R(1,1)}{x_{R1} - M_R(1,3)} X + \frac{M_R(1,4)}{x_{R1} - M_R(1,3)} \quad [1]$$

In Equation [1], Z denotes the spatial coordinates of line $l_{R1}$, $X_{R1}$ denotes X axis coordinates at the arbitrary position $R_1$ in an image coordinate system, $M_R$ denotes the projection matrix of the first camera 20, and $M_R(i,j)$ denotes a value in the i-th row and j-th column in the projection matrix of the first camera 20.

Further, the present invention detects points having patterns identical to the fringe pattern formed at the given position $R_1$, among the fringe patterns displayed on the reference surface 60, and individually connects the fringe pattern points, detected in this way, to the center point of the pattern projector 10. The lines for connecting the pattern projector 10 to the reference surface 60 intersect line $l_{R1}$ to connect the first camera 20 to the fringe edge point. Such multiple intersecting points indicate the candidate depth points of the measurement object at which 2π ambiguity may occur in the typical Moire principle, which are the candidate points A, B, C, and D having 2π ambiguity.

Figure 4:
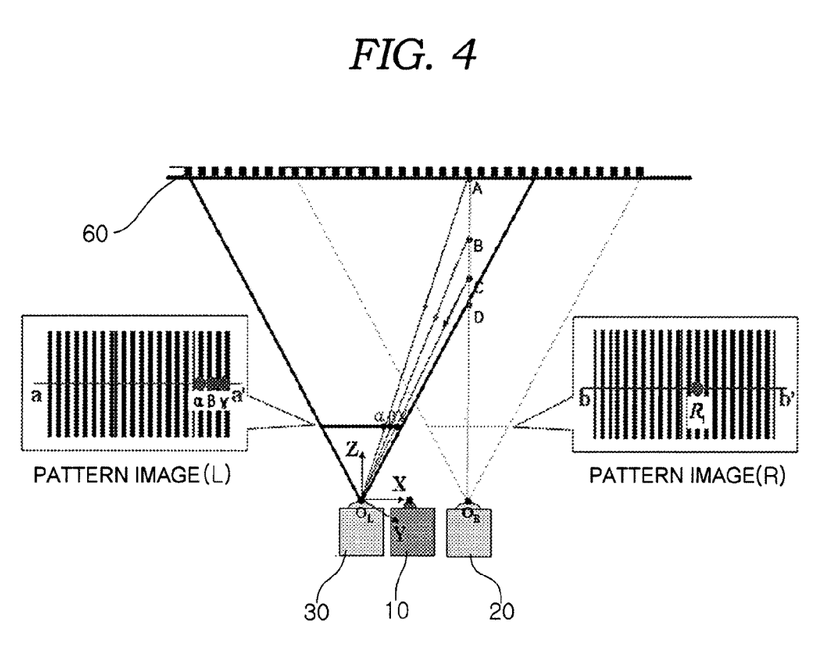

The second step S2 of the present invention is performed using the second camera 30, placed to the left of the first camera 20, in order to determine whether a corresponding point, having the intensity value of the fringe pattern formed at the projected point of candidate points in the second image plane identical to the intensity value of the fringe pattern formed at the given position $R_1$ in the first image plane, exists among the candidate points A, B, C, and D having 2π ambiguity.

Referring to FIG. 4, the present invention determines the corresponding point among the candidate points A, B, C, and D having 2π ambiguity by using the second camera 30 placed to the left of the first camera 20. In this step the present invention determines whether a corresponding point having the intensity value of the fringe pattern formed at the projected point of candidate points in the second image plane identical to the intensity value of fringe pattern formed at the arbitrary position $R_1$ exists, using the stereo matching principle. To do this, first we project the 3D positions of candidate points to the positions in the image plane of the second camera. This can be done on the basis of the following Equation [2].

$$s \begin{bmatrix} x_L \\ y_L \\ 1 \end{bmatrix} = M_L \begin{bmatrix} X_{cand} \\ Y_{cand} \\ Z_{cand} \\ 1 \end{bmatrix} \quad [2]$$

In Equation [2], $X_{cand}$, $Y_{cand}$, and $Z_{cand}$ denote 3-D coordinates at the candidate points A, B, C, and D having 2π ambiguity in the world coordinates, $M_L$ denotes the projection matrix of the second camera 30, and s denotes a scale factor for changing the scale.

The third step S3 of the present invention is performed to estimate the final depth value for the determined correspondence point by adopting the typical Moire method and is performed to repeat the first and second steps with respect to fringe edge points existing in all rows and columns. Thus, it measures the 3-D shape of the measurement object based on the typical Moire principle, using the resultant value at a corresponding point having 2π ambiguity, which is finally determined to have the identical fringe pattern.

The 3-D shape measurement method implemented to eliminate the 2π ambiguity of the Moire principle according to the present invention preferably satisfies the following conditions: First, in the present invention, the position of corresponding points in the intensity image of the first camera 20 must be placed on the right side of the position of corresponding points in the intensity image of the second camera 30 corresponding thereto. Second, in the present invention, fringe pattern images detected by the first and second cameras 20 and 30 for the corresponding points, which are finally determined to have the identical fringe pattern, are sequentially arranged respectively without the sequential positions thereof being changed. Third, in the present invention, the fringe pattern images of the first camera 20 must be sequentially arranged, even if the pattern images of the second camera 30 corresponding to the pattern images of the first camera 20 are not successively placed. This is called an occlusion condition.

Hereinafter, the results obtained from experiments, conducted on various objects according to the 3-D shape measurement method of the present invention and the conventional 3-D shape measurement method, are described below.

FIGS. 5A and 5B show a photograph of the 3-D shape measurement apparatus of FIG. 2, and a schematic diagram showing the relative location thereof, respectively.

Figure 5:
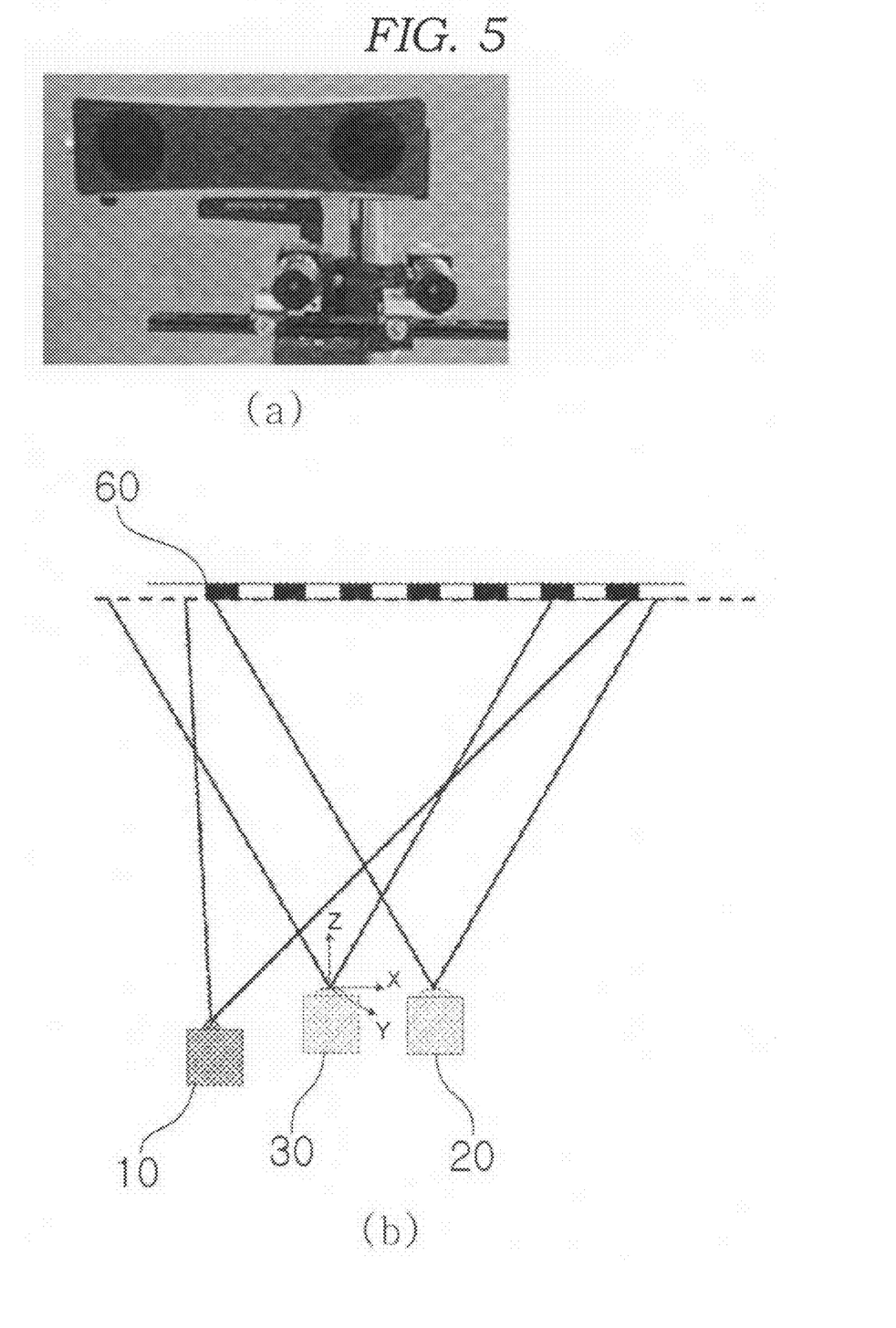
FIGS. 5A and 5B are views showing an actual picture of the 3-D shape measurement apparatus of FIG. 2, and a schematic diagram showing the relative location thereof, respectively.

The experiments were conducted using the apparatus including the pattern projector 10, and first and second cameras 20 and 30, as shown in FIG. 5. In this case, the pattern pitch in the reference surface 60 is 14 mm, the distance between the reference surface 60 and the second camera 30 placed on the left side is 558 mm, the distance between the first and second cameras 20 and 30 is 13 mm, and the pattern projector 10 is spaced apart from the second camera 30 by 81 mm in the negative direction of the X axis and by 105 mm in the negative direction of the Z axis in the world coordinates.

FIGS. 6A to 6E and 8A to 8E are views showing the results obtained by measuring respective measurement objects using a conventional 3-D shape measurement method and a 3-D shape measurement method according to one embodiment of the present invention.

Figure 6:
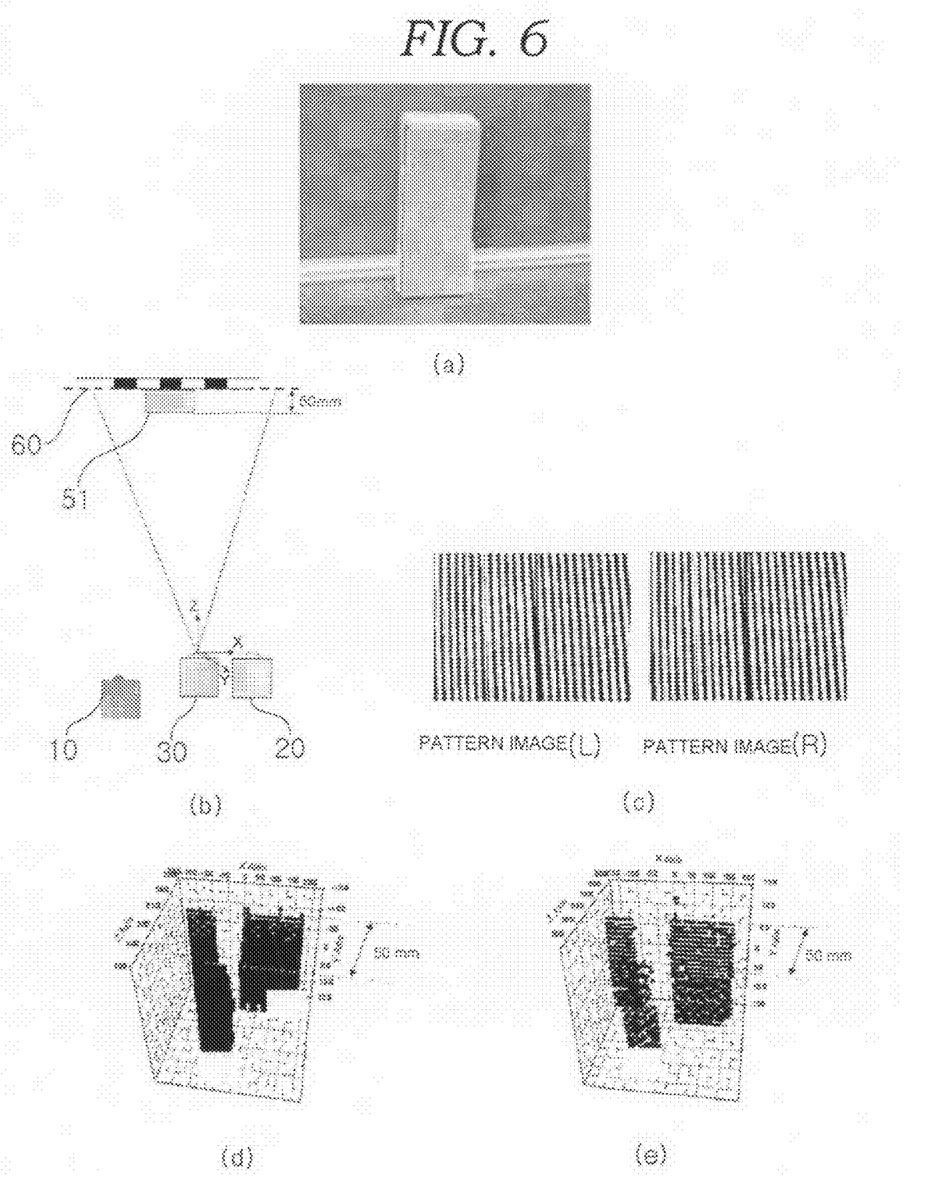
FIGS. 6A to 6E to 8A to 8E are views showing the measurement results using a conventional 3-D shape measurement method and the 3-D shape measurement method embodied in the present invention, respectively.

Experiment 1. Measurement object 51 having a thickness of 50 mm, as shown in FIG. 6A, was measured using the experimental apparatus of FIG. 5. The pattern images detected by the first and second cameras 20 and 30 are as shown in FIG. 6C. In this case, the conventional 3-D shape measurement method uses only the pattern projector 10 and the first camera 20 to measure object 51 based on the typical Moire principle, and thus derives the results shown in FIG. 6D. Further, the 3-D shape measurement method according to the present invention uses the pattern scanner 10 and the first and second cameras 20 and 30 to measure object 51 based on the typical Moire principle, and thus derives the results shown in FIG. 6E. That is, since the thickness (50 mm) of object 51 is less than the pitch of the fringe pattern, the conventional method and the method of the present invention derived the same experimental results, as shown in FIGS. 6D and 6E.

Figure 7:
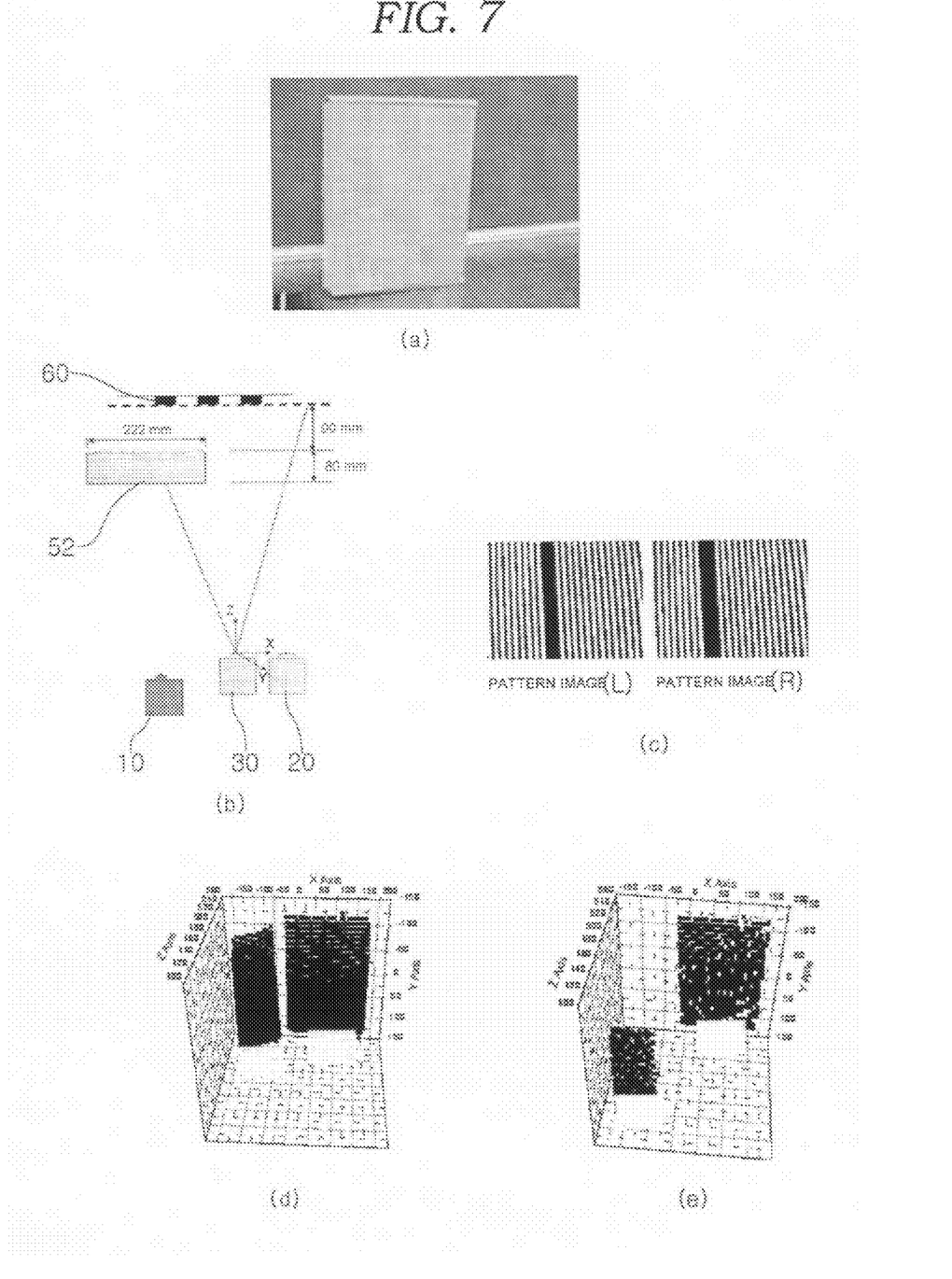

Experiment 2. As shown in FIG. 7A, measurement object 52 having a thickness of 80 mm was spaced apart from the reference surface 60 by 90 mm, and was measured using the experimental apparatus of FIG. 5. The pattern images detected by the first and second cameras 20 and 30 are as shown in FIG. 7C. In this case, the conventional 3-D shape measurement method uses the pattern projector 10 and only the first camera 20 to measure object 52 based on the typical Moire principle, and thus derives the results shown in FIG. 7D. However, the 3-D shape measurement method of the present invention uses the pattern projector 10 and the first and second cameras 20 and 30 to measure object 52 based on the typical Moire principle, and thus derives the results shown in FIG. 7E. That is, in the conventional measurement method, since the distance between the front surface of object 52 and the reference plane is greater than 2π of the pattern period in the state in which object 52 is spaced apart from the reference surface 60 by 90 mm, object 52 is displayed differently from spatial information about the actual object 52, as shown in FIG. 7D. However, in the measurement method of the present invention, object 52 is displayed as 3-D shape information identical to the actual spatial information, as shown in FIG. 7E.

Figure 8:
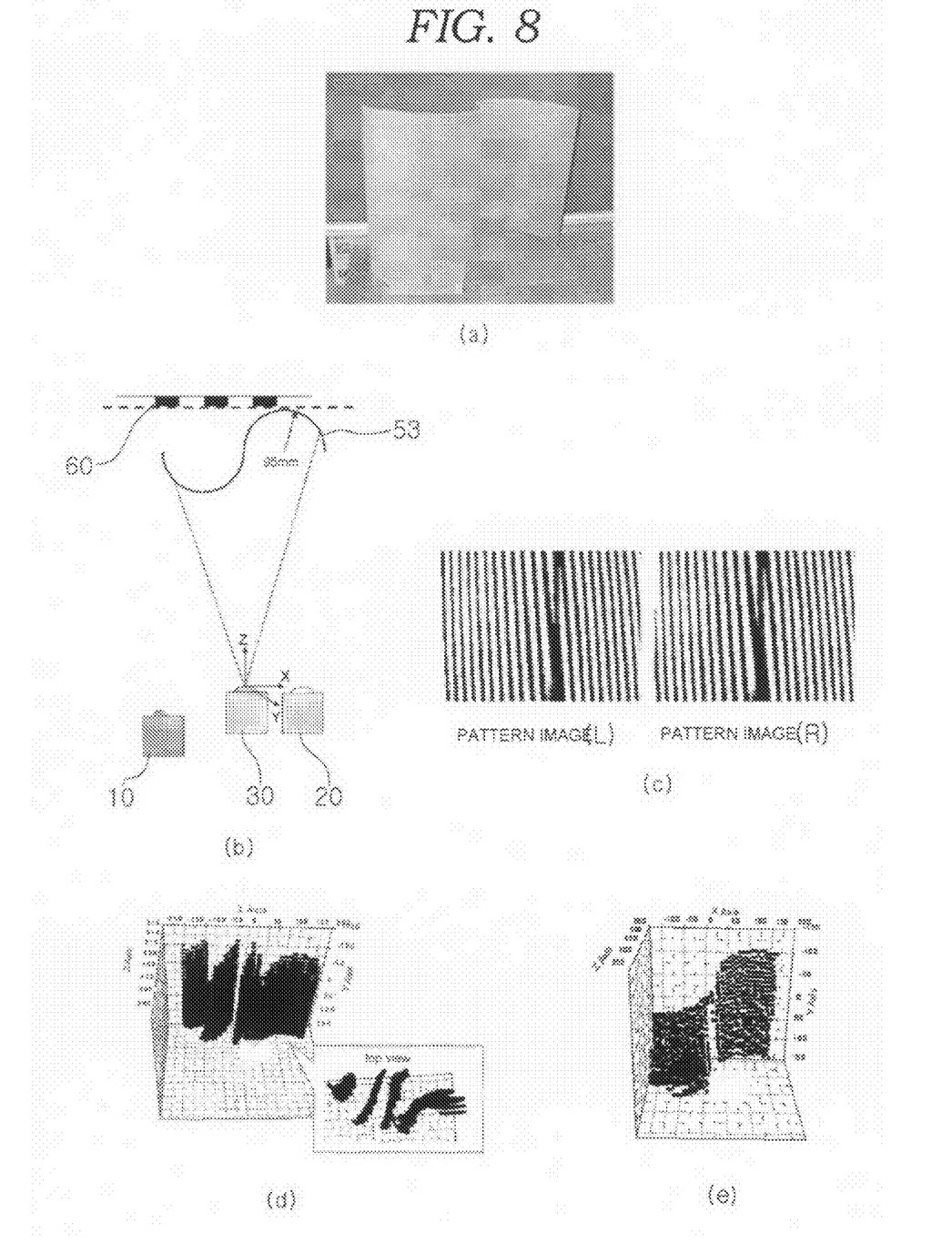

Experiment 3. As shown in FIG. 8A, a hemispherical measurement object 53 having a depth of 190 mm was measured using the experimental apparatus of FIG. 5. The pattern images detected by the first and second cameras 20 and 30 are as shown in FIG. 8C. Here, the conventional 3-D shape measurement method uses the pattern projector 10 and only the first camera 20 to measure object 53 based on the typical Moire principle, and thus derives the results of FIG. 8D. The 3-D shape measurement method according to the present invention uses the pattern projector 10 and the first and second cameras 20 and 30 to measure object 53 based on the typical Moire principle, and thus derives the results of FIG. 8E. That is, it is impossible to secure accurate spatial information about object 53 using the conventional measurement method, but the measurement method of the present invention obtains 3-D shape information identical to the actual spatial information about object 53, as shown in FIG. 8E.

Therefore, the 3-D shape measurement method according to the present invention can precisely measure a 3-D shape without requiring a hardware means for shifting the phase of the measurement object and eliminating the $2\pi$ ambiguity of the typical Moire principle, in contrast with the conventional method, as demonstrated in the three experiments outlined above.

As described above, the 3-D shape measurement apparatus and method according to the present invention is advantageous in that, although they use the typical Moire principle, the error of $2\pi$ ambiguity of the typical Moire principle is eliminated, and thus 3-D shape information can be more rapidly and accurately measured.

Further, the present invention is advantageous in that, since a pattern projector controls a pattern image, a hardware means for shifting the phase of a measurement object is not necessary, unlike the conventional measurement method.

Although the preferred embodiments of a 3-D shape measurement apparatus and method for eliminating the $2\pi$ ambiguity of the typical Moire principle and omitting a phase shifting means according to the present invention have been disclosed for illustrative purposes, those skilled in the art will appreciate that the embodiments are only exemplary, and are not intended to limit the present invention, and that various modifications, additions, and substitutions are possible, without departing from the scope and spirit of the invention as disclosed in the accompanying claims.

The invention claimed is:

1. A three-dimensional (3-D) shape measurement method using a Moire measurement principle and a Stereo vision measurement principle, comprising;
    a first step to detect candidate points and 3D positions of the candidate points in world coordinates which are identical results from typical Moiré technique by using a pattern projector, which adjusts a pitch of a fringe pattern and projects the fringe pattern to a measurement object, and a first camera, which detects a modulated fringe pattern caused by shape of the object, by means of obtaining candidate points by comparing a reference fringe pattern to the modulated fringe pattern and calculating 3D positions at an arbitrary point on an image captured from the first camera;
    a second step to determine a final matching point among the candidate points detected from the first step by using the Stereo vision technique with the first and the second cameras, by means of projecting the 3D positions of the candidate points to an image plane of the second camera based on a camera matrix of the second camera, comparing intensity value of a projected point in the image plane of the second camera to intensity value of given point in the image plane of the first camera, and judging whether the candidate point is matched with an arbitrary point by using the stereo vision criteria; and
    a third step to measure the depth value of the arbitrary point by using the resultant value of the final matching point, which was determined at the second step.

2. The 3-D shape measurement method according to claim 1, wherein the first step is performed to obtain the 3D position of candidate points having $2\pi$ ambiguity and the candidate points are the intersection positions between the line that connects the point having the same intensity value of a given arbitrary point at the reference plane with the center of the pattern projector and the line that connects the given arbitrary point with the optical center of camera by using the following equation:

$$Z = \frac{M_R(1,1)}{x_{R1} - M_R(1,3)} X + \frac{M_R(1,4)}{x_{R1} - M_R(1,3)}$$

where Z denotes depth value of the arbitrary position and the candidate points having $2\pi$ ambiguity, $X_{R1}$ denotes X axis coordinates at the arbitrary position in an image coordinate system, $M_R$ denotes a projection matrix of the first camera, and $M_R(i,j)$ denotes a value in an i-th row and a j-th column in the projection matrix of the first camera.

3. The 3-D shape measurement method according to claim 2, wherein the second step is performed to determine whether the corresponding point exists among the candidate points having $2\pi$ ambiguity, using an algorithm based on stereo matching, where the corresponding points have identical intensity values between intensity value of fringe pattern formed at position estimated by projecting the 3D position of the candidate points to the image plane of the second camera, to intensify value of fringe pattern at the arbitrary position.

4. The 3-D shape measurement method according to claim 1, wherein the second step is performed to determine whether the corresponding point exists among the candidate points having $2\pi$ ambiguity, using an algorithm based on stereo matching, where the corresponding points have identical intensity values between intensity value of fringe pattern formed at position estimated by projecting the 3D position of the candidate points to the image plane of the second camera.

5. A three-dimensional (3-D) shape measurement apparatus to eliminate $2\pi$ ambiguity of a typical Moire principle and omit the phase shifting means from a 3-D shape measurement apparatus, comprising:
    a pattern projector for periodically scanning light;
    first and second cameras for detecting fringe patterns using the light of the pattern projector; and
    a control unit for controlling operation of the pattern projector and the first and second cameras,
    wherein the pattern projector comprises a light source installed therein for radiating light, a rotating polygonal mirror for rotating by itself to reflect light radiated by the light source, and a photodetector for detecting part of the light reflected from the rotating polygonal mirror,
    wherein the first camera detects a fringe pattern at an arbitrary position so as to detect candidate points having $2\pi$ ambiguity,
    wherein the second camera is placed to left of the first camera and is adapted to determine whether a corresponding point, having a fringe pattern identical to the fringe pattern detected by the first camera, exists among the candidate points having $2\pi$ ambiguity, and
    wherein the control unit controls a rotating speed of the rotating polygonal mirror and On/Off periods of the light source according to a program preset on the basis of feedback information of light measured by the photodetector.

6. The 3-D shape measurement apparatus according to claim 5, wherein the pattern projector further comprises one or more timers operating in conjunction with the rotating polygonal mirror and the light source, respectively, in order to measure the rotating speed of the rotating polygonal mirror and measure the On/Off periods of the light source.

* * * * *